May 18, 1954

J. V. COWAN 2,678,538

FLUID PRESSURE TRANSMISSION SYSTEM

Filed Dec. 4, 1952

INVENTOR.
JOHN V. COWAN

BY
Joseph H. Lipschutz
ATTORNEY

May 18, 1954  J. V. COWAN  2,678,538
FLUID PRESSURE TRANSMISSION SYSTEM
Filed Dec. 4, 1952  2 Sheets-Sheet 2
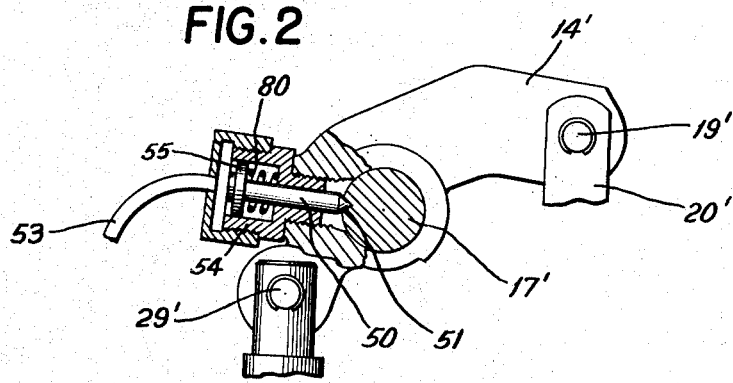
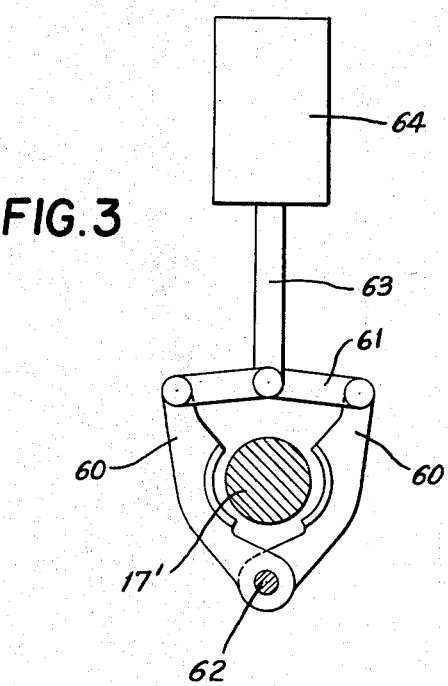
INVENTOR.
JOHN V. COWAN
BY
Joseph H. Lipschutz
ATTORNEY Patented May 18, 1954

2,678,538

UNITED STATES PATENT OFFICE 2,678,538

FLUID PRESSURE TRANSMISSION SYSTEM

John V. Cowan, Danbury, Conn., assignor to Sperry Products, Inc., Danbury, Conn., a corporation of New York Application December 4, 1952, Serial No. 324,093

5 Claims. (Cl. 60—54.5)

This invention relates to liquid control gear of the type wherein movement of a member at a transmitting station is caused to control movement of a member at a receiving station. More particularly this invention relates to control gear of this type wherein the transmitting and receiving stations are connected by a liquid transmission system. One such system is shown in the patent to H. S. Hele-Shaw and T. E. Beacham, No. 1,983,884, granted December 11, 1934, for Hydraulic Control Gear, in which the object is to apply a constant force to the fluid system at the transmitting end and to receive a corresponding constant force at the receiving end. Another such system is shown in the patent to Alfred N. Lawrence, No. 2,197,554, granted April 16, 1940, for Liquid Control Gear, in which the object consists in applying a continuously increasing load at the operated and receiving ends. In either of the aforementioned cases the operating and operated members will retain any position into which they may be moved without any tendency on their part to return to a centralized position.

In this type of transmission system a problem arises due to the fact that the fluid in the system changes its temperature causing contraction and expansion of the fluid with consequent relative displacement of the operating and operated members so that synchronism between these members is lost unless synchronization is effected. Such loss of synchronism occurs also when there is leakage of the fluid in the system. Therefore it has been customary in transmission systems of the type described to provide for synchronization at one end of the transmitter stroke at which time the connecting duct between the transmitting and receiving stations was connected to a fluid reservoir to permit interchange of fluid so that the operating and operated members were again brought into synchronism.

In the method of synchronization described above it was necessary to move both the operating and operated members to their extreme positions before synchronization could be effected. This was found to be undesirable in cases where the operated member had to remain in one position for a long period of time. Thus for instance in the case of engine test stands where the operated member controlled the setting of an engine throttle where the engine ran for several hundred hours, it was undesirable to disconnect the engine from the operated member in order to effect synchronization during the run. Therefore synchronism could not be effected throughout the long period of the test run. It is therefore one of the principal objects of this invention to provide a system wherein synchronization may be effected at any time without disturbing the position of the operated member.

Further objects and advantages of this invention will become apparent in the following detailed description thereof.

In the accompanying drawings,

Fig. 2 is an enlarged detail of a part disclosed in Fig. 1 with a portion thereof sectioned vertically.

Fig. 3 is a view of a locking means employed in the Fig. 1 form of the invention.

Figure 1:
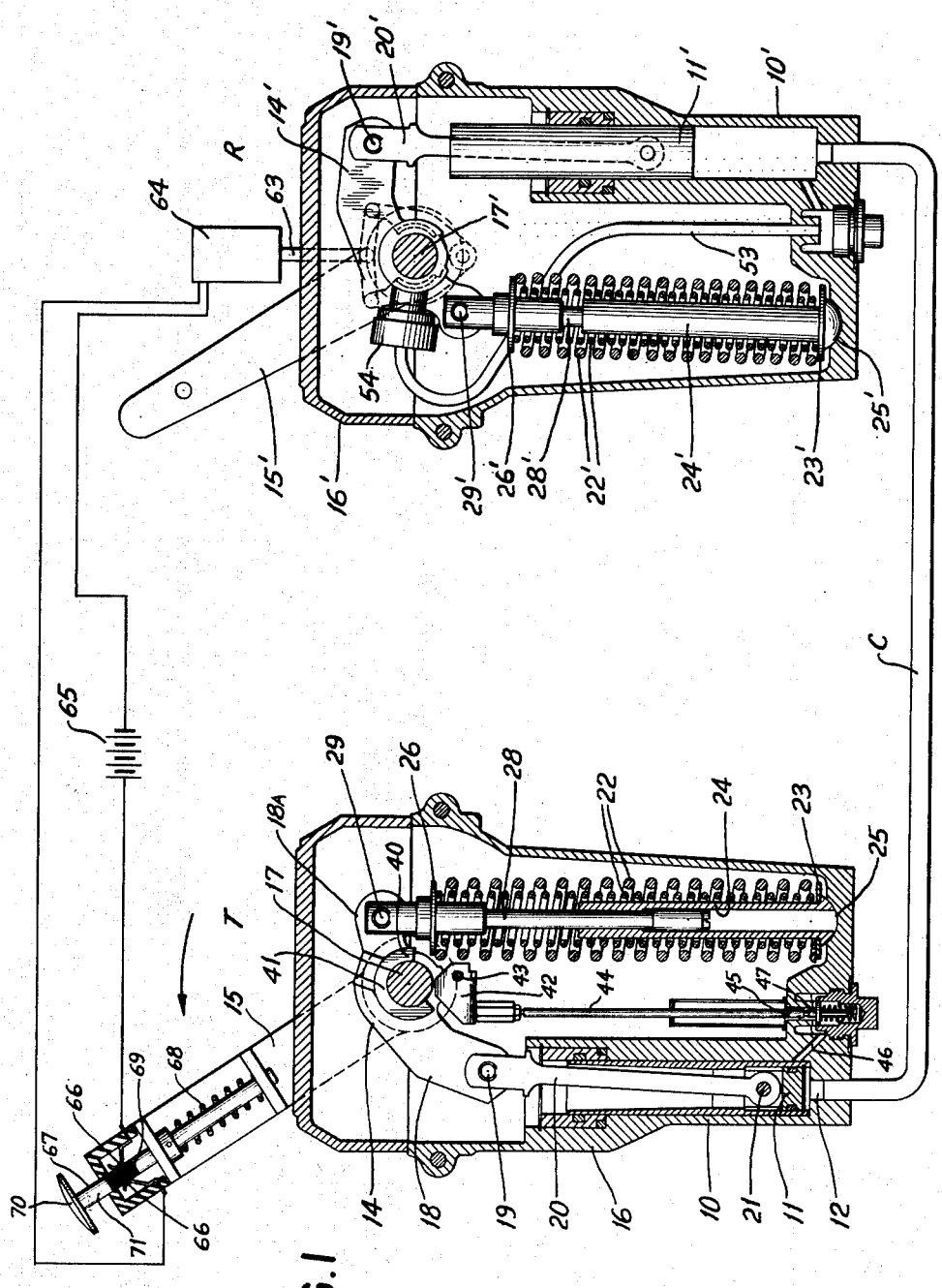
Fig. 1 is an assembly view with parts sectioned vertically of a liquid transmission system embodying this invention.

Referring to the drawings, it will be seen that the invention comprises three main parts, namely, a transmitting station T, a receiving station R, and a force transferring connection or duct C. Duct C is filled with fluid in a column which extends from a transmitter piston 11 to a receiver piston 11'. For applying force to the liquid column for the purpose of transmitting force, there may be provided within the transmitter T a cylinder 10 within which operates the piston 11. The cylinder is connected at one end to the duct C through passage 12 within the transmitter casing 16. For operating the piston in a direction to transmit force to the liquid column there may be provided a transmitting element in the form of a lever 14 pivoted within the casing 16 on a pivot 17 and having an operating handle 15 and the lever or crank arms 18 and 18A. The pivot 17 is supported at its ends in the casing in suitable bearings. The crank arm portion 18 is pivotally connected at 19 to the upper end of a piston rod 20 pivotally connected to the piston at 21. As the handle is moved in the direction of the arrow, the piston is lowered to cause the column of liquid to move through the duct C. The force which is applied to the piston is determined by one or more loading springs 22, seated at one end against the bracket 23, fixed upon the sleeve 24, pivoted at 25. The other end of the loading spring bears against the bracket 26 fixed to a rod 28, which operates within the sleeve member 24. The spring is under compression and applies the loading force to the lever arm 18A by way of the pivotal connection 29 between the upper end of rod 28 and the operating lever 14. The distance between the center of pivot 17 and the center of pivot 29 forms the crank arm 18 through which the force is applied. The positions of the spring and its connections are such that the spring acts through a small lever arm to apply a relatively light loading force to crank arm 18 and the piston 11 when the piston is in its uppermost position, but as the handle 15 is actuated in the direction of the arrow it will be seen that the spring acts through an increasing lever arm. At the same time, however, the spring is extended, so that while it acts through a larger lever arm it applies a decreasing force to said arm as the latter increases. The design of the various parts may be made such that the rate of decrease of the compressive force of the spring is equal to, greater than, or slower than the rate of increase of the lever arm as handle 15 is actuated in the direction of the arrow, depending upon the purpose to which the device is to be put, that is, whether the product of these two factors is to be substantially constant to yield a substantially constant loading force, or whether said product is to yield a continuously increasing or decreasing loading force.

The operation of handle 15 at the transmitting station just described to move piston 11 inwardly in its cylinder will cause piston 11' at the receiving end to be moved outwardly in its cylinder and cause a piston rod 20', connected to said piston, to actuate a lever 14' pivoted at 17'. The piston rod 20' is pivotally connected to one end of lever 14' at 19' and said lever 14' is pivotally connected at its other end at 29' to a two-part extensible member 24'—28' pivoted at its other end at 25' in the casing 16', the said two-part element 24'—28' being similar to the element 24—28, at the transmitting end. The two parts similarly hold between brackets 23' and 26' one or more compression springs 22' similar to spring 22. The distances between pivot 17' and pivot 19' and between 17' and 29' are the same as between pivot 17 and pivots 19 and 29. That is, it will be seen that the relationship of parts at the transmitter and the receiver are the same but in inverse order and therefore a force transmitted by movement of piston 11 will produce an equal movement of piston 11'.

As stated in the introduction hereto, if there is leakage of fluid between piston 11 and piston 11' or if there is expansion or contraction of the fluid in said system during operation, then it will be apparent that synchronism will be lost between the operating member 15 and the operated member 15' unless synchronization can be effected. Heretofore such synchronization was effected in the following manner: The transmitting handle or operating member 15 was operated in a clockwise direction (in the drawing) until a projection 40 carried by a hub 41 on the member 15 surrounding the pivot 17 struck a bell crank 42 to rock the same around its pivot 43 and cause it to depress a rod 44 extending through a passage 45 in the casing 16, said passage communicating with a passage 46 leading to the cylinder 10. Communication between passage 45 and passage 46 is normally closed by a valve 47, but when rod 44 is depressed said valve 47 is opened and communication between passage 45 and passage 46 is established. The interior of casing 16 is a reservoir which contains fluid up to a predetermined level so that when valve 47 is open cylinder 10 can communicate with the fluid in casing 16.

If by loss of synchronism piston 11' has reached the bottom of its cylinder 10' before piston 11 has reached the top of its cylinder, then continued movement of piston 11 upwardly after valve 47 has opened will allow fluid from casing 16 to flow into cylinder 10 and fill it with fluid. If by loss of synchronism piston 11' has not reached the bottom of cylinder 10' by the time piston 11 has reached its upper limit and opened valve 47, then the springs 22' will move piston 11' downwardly to the bottom of cylinder 10' to cause fluid to pass from the duct C through passages 46 and 45 into the casing 16. In either of the above cases synchronism is again effected because before valve 47 closes again piston 11' will be at its lower-most position while piston 11 is at its upper-most position, these positions constituting synchronism.

As stated in the introduction hereto, the hereinabove described method of synchronization meant that the rocker arms 14 and 14' had to be moved to their extreme positions in order to effect synchronization, and since operating member 15 and operated member 15' were heretofore both fixed to their respective pivots 17 and 17', this meant that whatever was connected to the operated member 15' had to be either disconnected or moved with the member 15' to its extreme position. In cases such as test runs on engines where the operated member 15 controls a given setting of a throttle continuously for several hundred hours, it was found inadvisable to disconnect the actuated member 15' during the test run, which meant that synchronization could not be effected throughout the period of said run.

By the following arrangement synchronization can be effected without disturbing the position of the operated member 15'. For this purpose operating member 15 is fixed to its shaft 17 and operated member 15' is fixed to its shaft 17'. Rocker 14 is fixedly attached to its pivot or shaft 17, but rocker 14' is releasably attached to its pivot or shaft 17'. The connection between rocker 14' and shaft 17' is by way of a pin 50 (Fig. 2) which seats in a detent or groove 51 in the pivot 17' and is normally held therein by the fluid pressure in the transmission system, said pressure being transmitted to pin 50 by means of a duct 53 which communicates at one end with the fluid in cylinder 10' and at its other end terminates in a cylinder 54 within which operates a piston 55 which forms a head on pin 50. While the fluid pressure in the system is maintained, as it always is until synchronization is effected, the pressure within the system is sufficient to keep pin 50 within the detent 51 so that the rocker arm 14' moves integrally with its pivot 17'.

However when synchronization is to be effected the following means are employed for releasing pin 50 from engagement with pivot 17' so that rocker 14' can move independently of the pivot and thus not disturb the actuated member 15' which is fixed to pivot 17'. For this purpose there is provided in cooperation with shaft 17' a lock consisting of two members 60 pivoted at one end on the casing at 62 and pivotally connected at their other ends to a toggle joint 61 operated by a rod 63 which may be part of the armature of a solenoid 64. The circuit through solenoid 64 may include a source of E. M. F. 65 and a switch comprising spring members 66 mounted on operating member 15 and engaging a spring press plunger 67 normally pressed by spring 68 to its upward position, in which position the contacts 66 engage an insulated member 69. When synchronization is to be effected the operator presses down upon button 70 at the upper end of plunger 67 to bring an electric conducting portion 71 into engagement with the spring fingers 66 to close the circuit through solenoid 64 and raise rod 63 to cause toggle joint 61 to be raised so that shaft 17' is firmly locked against movement between locking members 60. The operator now moves handle 15 in a clockwise direction (in the drawing), and since the shaft 17' is held, piston 11' cannot follow and suction is created in duct C. This causes a sharp drop in pressure in the transmission system which drops the pressure on the head 55 in cylinder 54 and permits spring 80 to move the pin 50 out of its detent 51. This occurs immediately upon the first movement of handle 15 in the clockwise direction. Rocker 14' is now free to move on shaft 17' and as handle 15 is moved to its extreme position with piston 11 in its extreme raised position to open valve 47, rocker arm 14' is rotating around the shaft 17' and piston 11' is descending. Synchronization is effected in the manner hereinbefore described, but actuated member 15' has not been disturbed. After synchronization has been effected handle 15' is moved back in a counter-clockwise direction to cause the rockers 14 and 14' to rotate until pin 50 snaps back into detent 51 because pressure in the system has been re-established as soon as handle 15 begins to move in the counter-clockwise direction. When pin 50 has snapped into its detent 51 the parts are in synchronized position without the actuated member having been disturbed.

Having described my invention, what I claim and desire to secure by Letters Patent is:

1. A fluid pressure transmission system comprising a transmitting station, a receiving station, and a duct connecting said stations, each station having a casing, a cylinder communicating with said duct, and a piston in each cylinder, an operating member at the transmitting station, an operated member at the receiving station, means connecting said members to the respective pistons, said means including a shaft rotatably mounted in each casing, said members being fixed to the respective shaft, a rocker fixed to the shaft in the transmitter casing, a rocker connected to the shaft in the receiver casing, each rocker being connected at one end to the respective piston, spring means connected to the other end of each rocker for applying force to the pistons, means for synchronizing the pistons and the rockers, said last-named means including a fluid reservoir in the transmitter casing, there being a passage from the transmitter cylinder to said reservoir, means for normally closing said passage, means for opening said passage when the transmitter piston is at one end of its stroke, means for releasing the connection between the rocker and the receiver shaft when the transmitter piston begins to move to synchronizing position, normally ineffective means for locking the shaft of the receiver against rotation, and means for rendering said locking means effective prior to moving the transmitter piston toward synchronizing position.

2. A fluid pressure transmission system as specified in claim 1, characterized by normally ineffective means for locking the shaft of the receiver against rotation, and means for rendering said locking means effective prior to moving the transmitter piston toward synchronizing position, said means for releasing the connection between the rocker and the receiver shaft being rendered effective after the locking means is rendered effective.

3. A fluid pressure transmission system as specified in claim 1, characterized by normally ineffective means for locking the shaft of the receiver against rotation, and means for rendering said locking means effective prior to moving the transmitter piston toward synchronizing position, said means for releasing the connection between the rocker and the receiver shaft being rendered effective after the locking means is rendered effective, said releasable connection comprising a pin slidable in said rocker, said shaft having a detent in which said pin engages.

4. A fluid pressure transmission system as specified in claim 1, characterized by normally ineffective means for locking the shaft of the receiver against rotation, and means for rendering said locking means effective prior to moving the transmitter piston toward synchronizing position, said means for releasing the connection between the rocker and the receiver shaft being rendered effective after the locking means is rendered effective, said releasable connection comprising a pin slidable in said rocker, said shaft having a detent in which said pin engages, a cylinder, a piston operating in said last-named cylinder, said piston being connected to said pin, and a duct connected at one end to the fluid pressure system between the transmitter and receiver pistons and connected at its other end to said last-named cylinder.

5. A fluid pressure transmission system as specified in claim 1, characterized by normally ineffective means for locking the shaft of the receiver against rotation, and means for rendering said locking means effective prior to moving the transmitter piston toward synchronizing position, said means for releasing the connection between the rocker and the receiver shaft being rendered effective after the locking means is rendered effective, said releasable connection comprising a pin slidable in said rocker, said shaft having a detent in which said pin engages, a cylinder, a piston operating in said last-named cylinder, said piston being connected to said pin, a duct connected at one end to the fluid pressure system between the transmitter and receiver pistons and connected at its other end to said last-named cylinder, and a spring in said last-named cylinder for moving said pin out of engagement with the receiver shaft when the spring pressure exceeds the pressure in said fluid pressure transmission system.

References Cited in the file of this patent

UNITED STATES PATENTS

| Number | Name | Date |
|---|---|---|
| 2,339,728 | Temple | Jan. 18, 1944 |
| 2,416,054 | Hebel | Feb. 18, 1947 |
| 2,430,930 | Hebel | Nov. 18, 1947 |